(12) United States Patent
Kitano et al.

(10) Patent No.: US 8,476,333 B2
(45) Date of Patent: Jul. 2, 2013

(54) PHOTOCURABLE COMPOSITION

(75) Inventors: Hajime Kitano, Kunitachi (JP); Shuyou Akama, Saitama (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 13/390,761

(22) PCT Filed: Aug. 9, 2010

(86) PCT No.: PCT/JP2010/005006
§ 371 (c)(1),
(2), (4) Date: Mar. 19, 2012

(87) PCT Pub. No.: WO2011/021363
PCT Pub. Date: Feb. 24, 2011

(65) Prior Publication Data
US 2012/0165498 A1  Jun. 28, 2012

(30) Foreign Application Priority Data
Aug. 19, 2009 (JP) .................................. 2009-190426

(51) Int. Cl.
*C08G 18/67* (2006.01)
*C08J 3/28* (2006.01)
*H05B 6/68* (2006.01)
*C08F 2/46* (2006.01)

(52) U.S. Cl.
USPC ................. 522/90; 522/1; 522/113; 522/134; 522/150; 522/162

(58) Field of Classification Search
USPC ..................... 522/90, 1, 113, 134, 150, 162
See application file for complete search history.

(56) References Cited

U.S. PATENT DOCUMENTS 4,775,732 A   10/1988  Lapin
6,028,212 A *  2/2000  Shah et al. .................... 560/115

FOREIGN PATENT DOCUMENTS

| JP | 3-502923 A | 7/1991 |
|----|------------|--------|
| JP | 5-093069 A | 4/1993 |
| JP | 2002-513987 A | 5/2002 |
| JP | 2004-035734 | * 2/2004 |
| JP | 2004-035734 A | 2/2004 |
| JP | 2008-195840 A | 8/2008 |
| WO | WO 89/06228 | 7/1989 |
| WO | WO 2009/057376 A1 | 5/2009 |

OTHER PUBLICATIONS

Chinese Office Action for corresponding Application No. 201080047293.9, issued Feb. 20, 2013.

* cited by examiner

*Primary Examiner* — Ling Choi
*Assistant Examiner* — Jessica E Whiteley
(74) *Attorney, Agent, or Firm* — Sughrue Mion, PLLC

(57) ABSTRACT

The present invention relates to a photocurable composition which exhibits excellent adhesiveness not only to thermoplastic resins such as PET and polyimide but also to adherends of metal oxides such as IZO and metals such as gold, more particularly to a photocurable composition which comprises a urethane oligomer (A) having two or more allyl ether and/or vinyl ether groups and a polythiol (B) having two or more thiol groups.

5 Claims, No Drawings

PHOTOCURABLE COMPOSITION

CROSS REFERENCE TO RELATED APPLICATIONS

This application is a National Stage of International Application No. PCT/JP2010/005006 filed Aug. 9, 2010, claiming priority based on Japanese Patent Application No. 2009-190426, filed Aug. 19, 2009, the contents of all of which are incorporated herein by reference in their entirety.

TECHNICAL FIELD

The present invention relates to a photocurable composition, and more particularly to a photocurable composition which exhibits excellent adhesiveness to various adherends such as thermoplastic resins, metal oxides and metals, in particular, PET (inter alia, untreated PET), polyimide, Au or IZO.

BACKGROUND ART

Thermosetting adhesive materials are conventionally known as adhesive materials for bonding electronic parts, machinery parts and so on. For example, adhesive materials used for bonding of electronic parts include anisotropic conductive film (ACF), anisotropic conductive paste (ACP), non-conductive film (NCF), non-conductive paste (NCP) and the like. However, since the conventional ACF, ACP, NCF and NCP are thermosetting adhesive materials, they require high temperature treatment and take longer to cure, which causes a problem of deterioration in productivity.

On the other hand, photocurable adhesive materials have been developed for bonding of electronic parts, etc. The photocurable adhesive materials may lead to improved productivity because adhesion is completed in an extremely short period of time upon light irradiation at low temperature.

Under such circumstances, for example, Patent Document 1 listed below discloses a photocurable adhesive material, which is made of an acrylate oligomer, an acrylate monomer diluent and a thiol compound.

PRIOR ART DOCUMENT

Patent Document

Patent Document 1: JP-A-2002-513987

SUMMARY OF THE INVENTION

Problem to be Solved by the Invention

However, recent assembly of electronic parts requires simultaneous bonding of adherends including metals such as gold and nickel, metal oxides such as IZO and ITO, and thermoplastic resins such as PET and polyimide. Therefore, there is a need for adhesive materials that exhibit excellent adhesiveness to various adherends, rather than to particular ones. Nonetheless, the above-described photocurable adhesive materials exhibit good adhesiveness only to particular adherends. Thus, there still remains room for further improvements in adhesiveness to metals such as gold, and metal oxides such as IZO.

Accordingly, an object of the present invention is to provide a photocurable composition with excellent adhesiveness to adherends including thermoplastic resins such as PET (particularly, so-called untreated PET without adhesive coating) and polyimide, but also metal oxides such as IZO and metals such as gold.

Means for Solving the Problem

To solve the above-described problems, the inventors have found a photocurable composition containing a particular urethane oligomer and a thiol, and, as a result, have accomplished the present invention.

That is, the photocurable composition of the present invention comprises: a urethane oligomer (A) having two or more allyl ether and/or vinyl ether groups; and a polythiol (B) having two or more thiol groups.

It is also desirable that a ratio of a total equivalent number of the thiol groups contained in the polythiol (B) to a total equivalent number of the allyl ether and/or vinyl ether groups contained in the urethane oligomer (A) is 0.7:1 to 1:0.7.

The photocurable composition of the present invention may further contain (C) a monomer.

It is also desirable that the urethane oligomer (A) is a urethane oligomer derived from a urethane prepolymer, the urethane prepolymer being synthesized from polypropylene glycol and isophorone diisocyanate.

Further, it is desirable that the urethane oligomer (A) is a urethane oligomer derived from a urethane prepolymer, the urethane prepolymer being synthesized from polyether polyol and isophorone diisocyanate.

It is also desirable that the urethane oligomer (A) is a urethane oligomer synthesized from the urethane prepolymer and allyl ether glycol and/or hydroxybutyl vinyl ether.

Further, it is desirable that the polythiol (B) is a polythiol derived from mercaptocarboxylic acid.

Effect of the Invention

The photocurable composition of the present invention may enhance adhesiveness to adherends including metal oxides such as IZO and metals such as gold, while maintaining good adhesiveness to thermoplastic resins such as PET (particularly, untreated PET) and polyimide. The photocurable composition of the present invention may be well adapted to increasingly diversifying assembly of electronic parts.

BEST MODE FOR CARRYING OUT THE INVENTION

The present invention will now be described in detail below.

The photocurable composition of the present invention comprises: a urethane oligomer (A) having two or more allyl ether and/or vinyl ether groups; and a polythiol (B) having two or more thiol groups.

[Urethane Oligomer (A)]

The above-described urethane oligomer (A) is a compound that contains two or more allyl ether and/or vinyl ether groups [$CH_2$=$CHCH_2O$— and/or $CH_2$=$CHO$—] as well as a plurality of urethane bonds (—NHCOO—). This urethane oligomer (A) may be produced by, e.g., synthesizing a urethane prepolymer from polyol and polyisocyanate, and adding to the urethane prepolymer a compound that has a hydroxyl group and an allyl ether glycol and/or hydroxy vinyl ether group.

Preferably, the urethane oligomer (A) has a weight average molecular weight (Mw) of 1,000-50,000, more preferably 1,500-40,000. If the urethane oligomer has a weight average molecular weight (Mw) below 1,000, the resultant composition may not provide sufficient adhesiveness; whereas above 50,000, the resultant composition may have a significantly high viscosity, which could exert adverse effects on productivity and workability.

As used herein, the term "weight average molecular weight (Mw)" refers to a value which is measured by GPC and calculated by polystyrene conversion.

The polyol for use in synthesizing the above-described urethane prepolymer is a compound having a plurality of hydroxyl groups. Specifically, examples of the polyol include polypropylene glycol, polyether polyol, polyester polyol, polytetramethylene glycol, polybutadiene polyol, alkylene oxide-modified polybutadiene polyol and polyisoprene polyol. Besides, the above-mentioned polyether polyol may be obtained by, e.g., adding an alkylene oxide such as ethylene oxide and propylene oxide to a polyol such as ethylene glycol, propylene glycol and glycerin. In addition, the polyester polyol may be obtained from, e.g., a polyol such as ethylene glycol, diethylene glycol, 1,4-butanediol, 1,6-hexanediol, propylene glycol, trimethylolethane and trimethylolpropane, and a polyvalent carboxylic acid such as adipic acid, glutaric acid, succinic acid, sebacic acid, pimelic acid or suberic acid.

The polyisocyanate is a compound having a plurality of isocyanate groups (NCO groups). Specifically, examples of the polyisocyanate include tolylene diisocyanate (TDI), diphenyl methane diisocyanate (MDI), crude diphenyl methane diisocyanate (crude MDI), isophorone diisocyanate (IPDI), hydrogenated diphenyl methane diisocyanate, hydrogenated tolylene diisocyanate, hexamethylene diisocyanate (HDI), and isocyanurate-, carbodiimide- and glycol-modified products thereof.

Preferably, a catalyst for urethanization reaction is used to synthesize the urethane prepolymer. Examples of the catalyst for urethanization reaction include organic tin compounds, inorganic tin compounds, organic lead compounds, monoamines, diamines, triamines, cyclic amines, alcohol amines, ether amines, organic sulfonic acids, inorganic acids, titanium compounds, bismuth compounds and quaternary ammonium salts. Among these, preferred are organic tin compounds. In addition, preferred organic tin compounds include dibutyltin dilaurate, dibutyltin diacetate, dibutyltin thiocarboxylate, dibutyltin dimaleate, dioctyltin thiocarboxylate, tin octenoate, monobutyl tin oxide and so on.

In addition, the compound having a hydroxyl group and an allyl ether and/or vinyl ether group to be added to the urethane prepolymer is a compound that has one or more hydroxyl group(s) and one or more allyl ether and/or vinyl ether group(s), and that may be added to the isocyanate groups of the urethane prepolymer. Examples of the compound having a hydroxyl group and an allyl ether and/or vinyl ether group include allyl ether glycol, hydroxypropyl vinyl ether, hydroxybutyl vinyl ether and so on.

[Polythiol (B)]

The photocurable composition of the present invention contains a polythiol (B). The polythiol (B) has thiol groups. This means that thiol groups are also present in the photocurable composition. In addition, the above-described urethane oligomer (A) has an allyl ether and/or vinyl ether group. Thus, an allyl ether and/or vinyl ether group is/are also present in the photocurable composition. Then, the polythiol (C) has thiol groups in an amount such that the ratio of the total equivalent number of the thiol groups contained in the polythiol (B) to the total equivalent number of the allyl ether and/or vinyl ether groups contained in the urethane oligomer (A) is preferably 0.7:1 to 1:0.7, more preferably 0.9:1 to 1:0.9, without limitation. As such, the thiol groups are present in a certain amount based on the amount of the allyl ether and/or vinyl ether groups. This allows improvements in adhesiveness to adherends including metal oxides such as IZO and metals such as gold, without interfering with the bonding development function provided by the allyl ether and/or vinyl ether groups.

Preferably, and without limitation, the above-described polythiol (B) is a polythiol derived from mercaptocarboxylic acid, more preferably a polythiol derived from 3-mercaptopropionic acid. This polythiol (B) preferably has a plurality of, more preferably two to six, mercaptoacyloxy groups in its molecule. Specifically, the mercaptoacyloxy groups include 3-mercaptopropionyloxy group [HS—$(CH_2)_2$—COO—], 3-mercaptobutyloxy group [HS—$CH(CH_3)$—$CH_2$—COO—], and so on. Among them, preferred is 3-mercaptopropionyloxy group. For example, when blended with a photopolymerization initiator, the polythiol (B) derived from mercaptocarboxylic acid generates thiyl radicals through those radicals derived from the photopolymerization initiator. These thiyl radicals are then added to unsaturated bonds of the allyl ether and/or vinyl ether groups to promote curing (crosslinking) reaction.

Specifically, preferred examples of the above-described polythiol (B) are: tetraethylene glycol bis(3-mercaptopropionate) represented by the following chemical formula (I); trimethylolpropane tris(3-mercaptopropionate) represented by the following chemical formula (II); tris[(3-mercaptopropionyloxy)-ethyl]isocyanurate represented by the following chemical formula (III); pentaerythritol tetrakis(3-mercaptopropionate) represented by the following chemical formula (IV); dipentaerythritol hexakis(3-mercaptopropionate) represented by the following chemical formula (V); 1,4-bis(3-mercaptobutyryloxy)butane represented by the following chemical formula (VI); pentaerythritol tetrakis(3-mercaptobutylate) represented by the following chemical formula (VII); and 1,3,5-tris(3-mercaptobutyloxyethyl)-1,3,5-triazine-2,4,6(1H,3H,5H)-trione represented by the following chemical formula (VIII).

[Chem. 1]

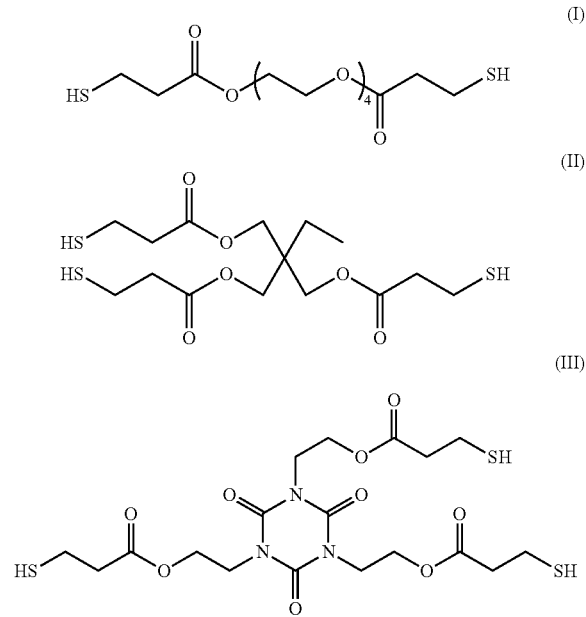

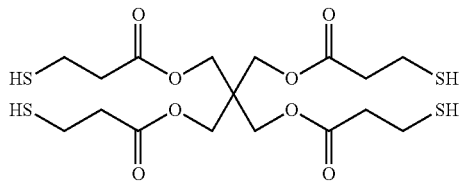

(IV)

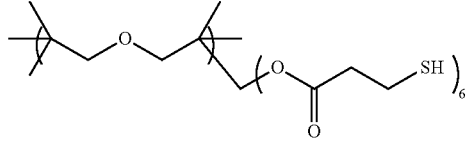

(V)

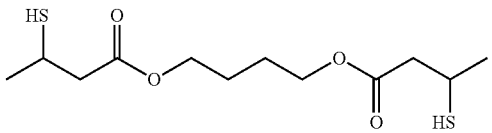

(VI)

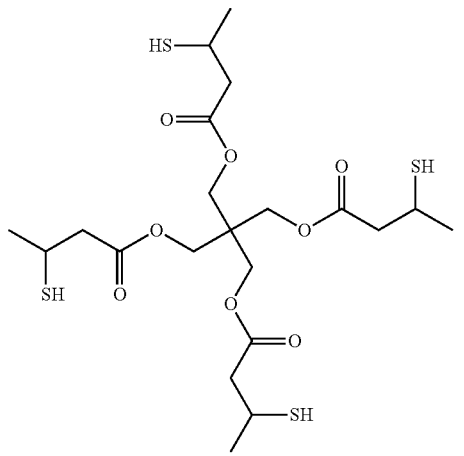

(VII)

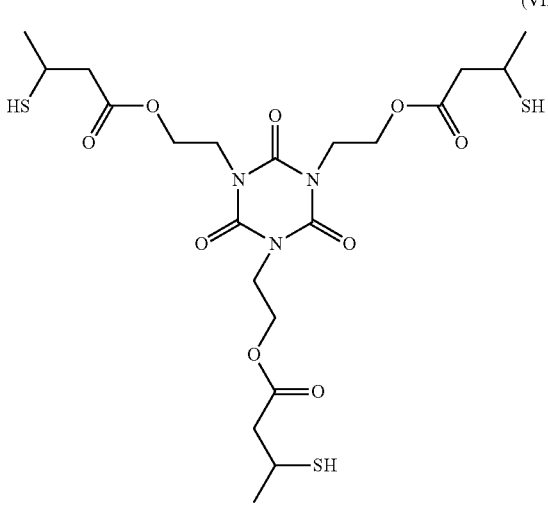

(VIII)

The polythiol (B) has good compatibility with the urethane oligomer (A), and thus forms a cross-linked polymer in a preferred manner with the allyl ether and/or vinyl ether groups contained therein. Besides, these polythiols (B) may be used alone or in a combination of two or more.

[Monomer (C)]

The photocurable composition of the present invention may contain a monomer (C). Preferably, the monomer (C) has an allyl ether and/or vinyl ether group. The monomer (C) may also have one or more functional groups.

Examples of the monomer having an allyl ether group include trimethylolpropane diallyl ether, pentaerythritol triallyl ether, glycerin diallyl ether, pentaerythritol diallyl ether, sorbitol diallyl ether and so on. Examples of the monomer having a vinyl ether group include cyclohexyl divinyl ether, triethylene glycol vinyl ether, triethylene glycol divinyl ether, 1,4-butanediol divinyl ether, tetraethylene glycol divinyl ether, trimethylolpropane trivinyl ether, cyclohexane-1,4-dimethylol divinyl ether, 1,4-butanediol divinyl ether and so on. Specific examples of the monomer having an allyl ether and/or vinyl ether group include allyl vinyl ether, methyl vinyl ether/allyl ether, ethyl vinyl ether/allyl ether and so on. These monomers (C) may be used alone or in a combination of two or more.

The monomer (C) may also be added to the photocurable composition of the present invention for viscosity adjustment and so forth.

[Photopolymerization Initiator (D)]

Preferably, the photocurable composition of the present invention further contains a photopolymerization initiator (D). Specific examples of the photopolymerization initiator (D) include: as intramolecular cleavage type, benzoin derivatives, benzyl ketals [e.g., IRGACURE 651 (trade name) manufactured by Ciba Specialty Chemicals Inc.], α-hydroxy acetophenones [e.g., DAROCUR 1173, IRGACURE 184, IRGACURE 127 (trade name) manufactured by Ciba Specialty Chemicals Inc.], α-amino acetophenones [e.g., IRGACURE 907, IRGACURE 369 (trade name) manufactured by Ciba Specialty Chemicals Inc.], a combination of α-amino acetophenones and thioxanthones (e.g., isopropylthioxanthone, diethylthioxanthone), acyl phosphine oxides [e.g., IRGACURE 819 (trade name) manufactured by Ciba Specialty Chemicals Inc.] and so on; and as hydrogen abstraction type, a combination of benzophenones and amine, a combination of thioxanthone and amine, and so on. A combination of intramolecular cleavage type and hydrogen abstraction type is also possible. Among others, oligomerized α-hydroxy acetophenones and acrylated benzophenones are preferred. More specific examples include oligo[2-hydroxy-2-methyl-1-[4-(1-methylvinyl)phenyl]propanone] (e.g., ESACURE KIP150 (trade name) manufactured by Lamberti S.p.A), acrylated benzophenone (e.g., Ebecryl P136 (trade name) manufactured by Daicel-UCB Company, Ltd.), imide acrylate and so on.

In addition to the above, the following may also be used as the photopolymerization initiator (D): 1-[4-(2-hydroxyethoxy)phenyl]-2-methyl-1-propane-1-one, 1-hydroxy-cyclohexyl-phenylketone [e.g., IRAGACURE184 (trade name) manufactured by Ciba Specialty Chemicals Inc.], a mixture of 1-hydroxy-cyclohexyl-phenyl-ketone and benzophenone, 2,2-dimethoxy-1,2-diphenylethane-1-one, 2,4,6-trimethylbenzoyl phenylphosphine oxide, 2,4,6-trimethylbenzoyl phenyl phenyl ethoxyphosphine oxide, 2-benzyl-2-dimethylamino-1-(4-morpholinophenyl)butanone-1,2-hydroxy-2-methyl-1-phenyl-propane-1-one, 2-methyl-1-[(4-methylthio)phenyl]-2-morpholinopropane-1-one, benzoyl methyl ether, benzoyl ethyl ether, benzoyl butyl ether, benzoyl isopropyl ether, bis(2,4,6-trimethylbenzoyl)phenylphosphine oxide, 2-hydroxy-2-methyl-[4-(1-methylvinyl)phenyl]propanol oligomer, a mixture of 2-hydroxy-2-methyl-[4-(1-methylvinyl)phenyl]propanol oligomer and 2-hydroxy-2-methyl-1-phenyl-1-propanone, isopropylthioxanthone, methyl o-benzoylbenzoate, [4-(methylphenylthio)phenyl]phenylmethane and so on.

Without limitation, the photopolymerization initiator (D) is contained in an amount within a range of preferably 0.01-10 parts by mass, more preferably 0.05-7 parts by mass, even more preferably 0.1-5 parts by mass, per 100 parts by mass of the total of the urethane oligomer (A), polythiol (B) and monomer (C). If the photopolymerization initiator (D) is contained in an amount less than 0.01 part by mass, the initiator becomes less effective to initiate photocuring of the photocurable composition; whereas above 10 parts by mass, the effect exerted by the initiator on photocuring initiation becomes saturated, in which case, however, the raw material cost of the photocurable composition increases and any initiator residues may lead to discoloration, degradation and the like.

[Other Additives]

In addition to the above-described urethane oligomer (A), polythiol (B), monomer (C) and photopolymerization initiator (D), the photocurable composition of the present invention may also contain other additives in an amount without departing from the object of the invention. For example, these additives include: inorganic substances such as calcium carbonate, aluminum hydroxide, silica, clay, talc and titanium oxide; inorganic hollow bodies such as glass balloons, shirasu balloons or ceramic balloons; organic substances such as nylon beads, acrylic beads or silicon beads; fillers selected from the organic hollow bodies including vinylidene chloride balloons, acrylic balloon and so on; foaming agents; dyes; pigments; silane coupling agents; polymerization inhibitors; stabilizers; and so on.

As mentioned above, the photocurable composition of the present invention exhibit excellent adhesiveness to not only thermoplastic resins such as PET (particularly, untreated PET) and polyimide, but also to metal oxides such as IZO and metals such as gold. Thus, the photocurable composition of the present invention can be used for bonding of various adherends as described above in a preferred manner, and more specifically, it is very useful as an adhesive material for electronic members including anisotropic conductive film (ACF), anisotropic conductive paste (ACP), non-conductive film (NCF), non-conductive paste (NCP), and so on.

EXAMPLES

While the present invention will now be specifically described based on the following examples, the invention is not intended to be limited thereto.

[Synthesis of Urethane Prepolymer]

In this case, 100.0 parts by weight of bifunctional polypropylene glycol having a number average molecular weight of 400, 69.09 parts by weight of isophorone diisocyanate (molecular weight: 222.29) and 0.01 part by weight of dibutyltin dilaurate are weighed into a 1 L three-necked flask, then reacted under stirring for mixing at 80° C. for 4 hours to synthesize a urethane prepolymer A which has isocyanate groups at both terminals of the molecular chain.

[Synthesis of Urethane Allyl Ether Oligomer]

In this case, 7.7 parts by weight of allyl ether glycol is added to 100 parts by weight of the above-described urethane prepolymer A, then reacted under stirring for mixing at 80° C. for 4 hours to synthesize a both-terminal-modified urethane allyl ether oligomer A (weight average molecular weight (Mw): 3,000).

[Synthesis of Urethane Vinyl Ether Oligomer]

In this case, 8.7 parts by weight of hydroxybutyl vinyl ether is added to 100 parts by weight of the above-described urethane prepolymer A, then reacted under stirring for mixing at 80° C. for 4 hours to synthesize a both-terminal-modified urethane vinyl ether oligomer A (weight average molecular weight (Mw): 3,100).

Examples 1-20

Comparative Examples 1-19

Photocurable compositions are prepared according to a compounding recipe shown in Tables 1-4. Measurements were made by the method as described below to determine the bonding strength to each adhered (PET: "Lumirror T60" manufactured by Toray Industries, Inc.; PI: "Kapton 200EN-508X100-K3CAA" manufactured by Toray Industries, Inc.; IZO: "HP125CC-B200" manufactured by Teijin Limited; Au: gold evaporated film for FPC manufactured by Maruwa Corporation). Using the following method, C=C conversion rate in relation to the surface of the cured product was also measured. The results are shown in Tables 1-4.

[Measurements of Bonding Strength to Each Adherend]

(1) Each photocurable composition is applied to a control substrate to a thickness of 50 μm; (2) readily bondable PET (03LF8) is placed on the composition as a backer so that the composition is sandwiched between the substrate and PET; (3) the readily bondable PET is irradiated with UV from above using a high-pressure mercury lamp in the atmosphere, so that the accumulated light amount becomes 500 mJ under the condition of irradiation strength of 100 mW/cm$^2$ at a wavelength of 365 nm to fabricate a sample; and (4) each sample is then subjected to a peeling test in accordance with JIS K6854-2.

[Measurements of C=C Conversion Rate]

(1) The surface of the cured product is subjected to the measurement using FT-IR (ATR); and (2) the infrared absorption spectrum of the surface was analyzed and calculated.

TABLE 1

|  |  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| urethane oligomer *[1] | UAEO-A *[3] | 100 |  | 70 |  | 100 |  | 100 | 100 | 100 | 100 |
| (equivalents) | UVEO-A *[4] |  | 100 |  | 70 |  | 100 |  |  |  |  |
| polythiol *[1] | EGMP-4 *[5] |  |  |  |  |  |  | 100 |  |  |  |
| (equivalents) | TMMP *[6] |  |  |  |  |  |  |  | 100 |  |  |
|  | TEMPIC *[7] |  |  |  |  |  |  |  |  | 100 |  |
|  | PEMP *[8] | 100 | 100 | 100 | 100 | 70 | 70 |  |  |  |  |
|  | DPMP *[9] |  |  |  |  |  |  |  |  |  | 100 |
| monomer *[1] | TMPDAE *[10] |  |  |  |  |  |  |  |  |  |  |
| (equivalents) | PETAE *[11] |  |  |  |  |  |  |  |  |  |  |
|  | CHDVE *[12] |  |  |  |  |  |  |  |  |  |  |
|  | TEGVE *[13] |  |  |  |  |  |  |  |  |  |  |
|  | BDDVE *[14] |  |  |  |  |  |  |  |  |  |  |

TABLE 1-continued

|  |  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| photopolymerization initiator *2 (parts by mass) | IRG184D *15 | 1 | 1 | 1 | 1 | 1 | 1 | 1 | 1 | 1 | 1 |
| curability evaluation (%) *16 | Rate (C=C > C−C) | 92 | 93 | 99 | 99 | 69 | 69 | 95 | 94 | 89 | 88 |
| bonding evaluation (N/m) | PET | 253 | 208 | 310 | 243 | 227 | 289 | 270 | 435 | 475 | 208 |
|  | PI | 954 | 813 | 742 | 711 | 513 | 543 | 480 | 755 | 811 | 755 |
|  | IZO | 412 | 347 | 381 | 367 | 367 | 387 | 443 | 515 | 511 | 403 |
|  | Au | 841 | 810 | 773 | 785 | 611 | 554 | 393 | 622 | 876 | 911 |

TABLE 2

|  |  | Ex. 11 | Ex. 12 | Ex. 13 | Ex. 14 | Ex. 15 | Ex. 16 | Ex. 17 | Ex. 18 | Ex. 19 | Ex. 20 |
|---|---|---|---|---|---|---|---|---|---|---|---|
| urethane oligomer *1 (equivalents) | UAEO-A *3 |  |  |  |  |  | 100 | 60 |  | 90 | 90 |
|  | UVEO-A *4 | 100 | 100 | 100 | 100 |  |  |  | 100 |  |  |
| polythiol *1 (equivalents) | EGMP-4 *5 | 100 |  |  |  |  |  |  | 60 |  |  |
|  | TMMP *6 |  | 100 |  |  |  |  |  |  |  |  |
|  | TEMPIC *7 |  |  | 100 |  |  |  |  |  |  |  |
|  | PEMP *8 |  |  |  |  | 60 | 100 | 60 | 100 | 100 | 100 |
|  | DPMP *9 |  |  |  | 100 |  |  |  |  |  |  |
| monomer *1 (equivalents) | TMPDAE *10 |  |  |  |  |  |  |  |  | 10 |  |
|  | PETAE *11 |  |  |  |  |  |  |  |  |  |  |
|  | CHDVE *12 |  |  |  |  |  |  |  |  |  | 10 |
|  | TEGVE *13 |  |  |  |  |  |  |  |  |  |  |
|  | BDDVE *14 |  |  |  |  |  |  |  |  |  |  |
| photopolymerization initiator *2 (parts by mass) | IRG184D *15 | 1 | 1 | 1 | 1 | 1 | 1 | 1 | 1 | 1 | 1 |
| curability evaluation (%) *16 | Rate (C=C > C−C) | 98 | 96 | 91 | 90 | 58 | 99 | 55 | 98 | 94 | 95 |
| bonding evaluation (N/m) | PET | 167 | 258 | 397 | 211 | 98 | 96 | 85 | 89 | 230 | 187 |
|  | PI | 415 | 814 | 831 | 823 | 311 | 288 | 331 | 278 | 541 | 561 |
|  | IZO | 323 | 384 | 484 | 357 | 150 | 278 | 137 | 281 | 421 | 435 |
|  | Au | 470 | 813 | 756 | 835 | 223 | 291 | 231 | 273 | 483 | 512 |

TABLE 3

|  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|---|
| urethane oligomer *1 (equivalents) | UAEO-A *3 | 100 |  |  |  |  |  |  |  |  |  |
|  | UVEO-A *4 |  | 100 |  |  |  |  |  |  |  |  |
| polythiol *1 (equivalents) | EGMP-4 *5 |  |  |  |  |  |  |  | 100 |  |  |
|  | TMMP *6 |  |  | 100 |  |  |  |  |  | 100 |  |
|  | TEMPIC *7 |  |  |  | 100 |  |  |  |  |  | 100 |
|  | PEMP *8 |  |  |  |  | 100 |  |  |  |  | 100 |
|  | DPMP *9 |  |  |  |  |  | 100 |  |  |  |  |
| monomer *1 (equivalents) | TMPDAE *10 |  |  | 100 | 100 | 100 | 100 |  |  |  |  |
|  | PETAE *11 |  |  |  |  |  |  | 100 | 100 | 100 | 100 |
|  | CHDVE *12 |  |  |  |  |  |  |  |  |  |  |
|  | TEGVE *13 |  |  |  |  |  |  |  |  |  |  |
|  | BDDVE *14 |  |  |  |  |  |  |  |  |  |  |
| photopolymerization initiator *2 (parts by mass) | IRG184D *15 | 1 | 1 |  | 1 | 1 |  |  |  |  |  |
| curability evaluation (%) *16 | Rate (C=C > C−C) | 0.3 | 0.2 | 88 | 91 | 86 | 87 | 71 | 77 | 87 | 81 |
| bonding evaluation (N/m) | PET | N/A | N/A | 10 | 12 | 14 | 13 | 13 | 6 | 18 | 6 |
|  | PI | N/A | N/A | 13 | 22 | 17 | 16 | 13 | 9 | 60 | 9 |
|  | IZO | N/A | N/A | 12 | 11 | 17 | 15 | 13 | 7 | 21 | 7 |
|  | Au | N/A | N/A | 16 | 45 | 18 | 21 | 14 | 12 | 98 | 4 |

TABLE 4

| | | Comp. Ex. 11 | Comp. Ex. 12 | Comp. Ex. 13 | Comp. Ex. 14 | Comp. Ex. 15 | Comp. Ex. 16 | Comp. Ex. 17 | Comp. Ex. 18 | Comp. Ex. 19 |
|---|---|---|---|---|---|---|---|---|---|---|
| urethane oligomer *1 (equivalents) | UAEO-A *3 | | | | | | | | | |
| | UVEO-A *4 | | | | | | | | | |
| polythiol *1 (equivalents) | EGMP-4 *5 | | | | | | | | | |
| | TMMP *6 | | 100 | | | | 100 | | | |
| | TEMPIC *7 | | | 100 | | | | 100 | | 100 |
| | PEMP *8 | | | | 100 | | | | 100 | |
| | DPMP *9 | 100 | | | | 100 | | | | |
| monomer*1 (equivalents) | TMPDAE *10 | | | | | | | | | |
| | PETAE *11 | 100 | | | | | | | | |
| | CHDVE *12 | | 100 | 100 | 100 | 100 | | | | |
| | TEGVE *13 | | | | | | 100 | 100 | 100 | |
| | BDDVE *14 | | | | | | | | | 100 |
| photopolymerization initiator *2 (parts by mass) | IRG184D *15 | | | | | | | | | |
| curability evaluation (%) *16 | Rate (C=C>C−C) | 78 | 99 | 99 | 99 | 99 | 99 | 99 | 98 | 98 |
| bonding evaluation (N/m) | PET | 10 | 6 | 40 | 3 | 6 | 11 | 12 | 4 | 13 |
| | PI | 19 | 11 | 177 | 8 | 14 | 33 | 58 | 4 | 17 |
| | IZO | 15 | 6 | 34 | 3 | 5 | 3 | 7 | 3 | 4 |
| | Au | 36 | 7 | 180 | 8 | 18 | 4 | 95 | 5 | 18 |

*1 equivalents of allyl ether and/or vinyl ether groups contained in the oligomer, equivalents of thiol groups contained in the polythiol, and equivalents of allyl ether and/or vinyl ether groups contained in the monomer
*2 parts by mass of the photoinitiator per 100 parts by mass of the total of the oligomer, polythiol and monomer
*3 synthetic, urethane allyl ether oligomer A
*4 synthetic, urethane vinyl ether oligomer A
*5 tetraethylene glycol bis(3-mercaptopropionate)
*6 trimethylolpropane tris(3-mercaptopropionate)
*7 tris[(3-mercaptopropionyloxy)-ethyl]isocyanurate
*8 pentaerythritol tetrakis(3-mercaptopropionate)
*9 dipentaerythritol hexakis(3-mercaptopropionate)
*10 trimethylolpropane diallyl ether
*11 pentaerythritol triallyl ether
*12 cyclohexyl divinyl ether
*13 triethylene glycol vinyl ether
*14 1,4-butanediol divinyl ether
*15 "IRGACURE 184D" (trade name) manufactured by Ciba Specialty Chemicals Inc., 1-hydroxycyclohexyl phenyl ketone
*16 C=C conversion It can be seen from the results shown in Tables 1-4 that Examples 1 and 2, for example, each of which contains 100 equivalents of polythiol (B), offer good curability and exhibit extremely high adhesiveness to all types of adherends, as compared with Comparative Examples 1 and 2, each of which contains urethane oligomer (A).

It will also be appreciated that Examples 1-6 achieve the same or better results as compared with Examples 15 and 17, wherein the ratio of the equivalent number of the thiol groups to the equivalent number of the allyl ether and/or vinyl ether groups is less than 1:0.7, and Examples 16 and 18, wherein the ratio of the equivalent number of the thiol groups to the equivalent number of the allyl ether and/or vinyl ether groups is greater than 0.7:1.

Further, it will be understood that Examples 19-20, each of which contains the monomer (C), also have the same or more significant effect.

It will also be noted that Examples 1-20 still have the same or more significant effect even when compared with Comparative Examples 3-19, each of which contains the monomer (C) in place of the urethane oligomer (A).

INDUSTRIAL APPLICABILITY

As described above, the photocurable composition of the present invention exhibits excellent adhesiveness not only to thermoplastic resins such as PET (particularly, untreated PET) and polyimide but also to metal oxides such as IZO and metals such as gold. Therefore, the photocurable composition of the present invention may preferably be applicable to the adhesion of these various adherends. More specifically, the photocurable composition of the present invention is very useful as an adhesive material for electronic members such as anisotropic conductive film (ACF), anisotropic conductive paste (ACP), non-conductive film (NCF) and non-conductive paste (NCP).

The invention claimed is:

1. A photocurable composition comprising: a urethane oligomer (A) having two or more allyl ether and/or vinyl ether groups; and a polythiol (B) having two or more thiol groups,
   wherein the urethane oligomer (A) is a urethane oligomer derived from a urethane prepolymer, the urethane prepolymer being synthesized from (i) polypropylene glycol and isophorone diisocyanate or from (ii) polyether polyol and isophorone diisocyanate,
   the urethane oligomer (A) is a urethane oligomer synthesized from the urethane prepolymer and allyl ether glycol and/or hydroxybutyl vinyl ether, and
   the polythiol (B) is a polythiol derived from mercaptocarboxylic acid.

2. The photocurable composition according to claim 1, wherein a ratio of a total equivalent number of the thiol groups contained in the polythiol (B) to a total equivalent number of the allyl ether and/or vinyl ether groups contained in the urethane oligomer (A) is 0.7:1 to 1:0.7.

3. The photocurable composition according to claim 1, further comprising a monomer (C).

4. The photocurable composition according to claim 1, wherein the urethane oligomer (A) is a urethane oligomer derived from a urethane prepolymer, the urethane prepolymer being synthesized from polypropylene glycol and isophorone diisocyanate.

5. The photocurable composition according to claim 1, wherein the urethane oligomer (A) is a urethane oligomer derived from a urethane prepolymer, the urethane prepolymer being synthesized from polyether polyol and isophorone diisocyanate.

* * * * *